(12) United States Patent
Itjeshorst

(10) Patent No.: US 6,529,483 B1
(45) Date of Patent: Mar. 4, 2003

(54) COMMUNICATION SYSTEM, METHOD AND PROCESSING MEANS FOR SWITCHING CALLS VIA A TRANSMISSION NETWORK DISPOSED BETWEEN TWO LOCAL NETWORKS

(75) Inventor: Paul Gerhard Itjeshorst, Düsseldorf (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/076,840

(22) Filed: May 13, 1998

(30) Foreign Application Priority Data

May 14, 1997 (DE) .......................... 197 20 274

(51) Int. Cl.[7] .......................... H04Q 11/00; H04L 12/28
(52) U.S. Cl. .......................... 370/259; 370/360; 370/410
(58) Field of Search .................. 370/244, 259, 370/352–357, 360, 410, 400–401, 422, 522; 379/156–157, 159–160, 165, 201, 204, 207, 210–211, 219–220

(56) References Cited

U.S. PATENT DOCUMENTS

| | | | |
|---|---|---|---|
| 5,311,572 A | 5/1994 | Friedes et al. ......... | 379/211.02 |
| 5,420,914 A | 5/1995 | Blumhardt ............. | 379/114.09 |
| 5,473,681 A | 12/1995 | Partridge, III ......... | 379/221.02 |
| 5,812,533 A * | 9/1998 | Cox et al. .................... | 370/259 |

FOREIGN PATENT DOCUMENTS

EP        658063 A    6/1995
WO       WO97/07625    2/1997

OTHER PUBLICATIONS

Kusaura et al, "Distribution of service data to distributed SCPs in the advanced IN", Global Telecommunications Conference, 1995,GLOBECOM '95., IEEE, vol. 2, 1995, pp. 1272–1276.*
Kocsis, Ferenc, "Translation of Excerpts from NTZ, vol. 11 / 1996" from *Gebührenabrechnung in zusammengeschalteten TK–Netzen.*
*Spezifikation Verbindungsnetzbetreiberauswahl (Carrier Selection) Phase 1*, Dec. 3, 1996 (with partial translation).
"Zeichengabe im ZZN7", *Schnittstellen–Spezifikation*, Mar. 31, 1997 *Specifications of Signalling System No. 7: Formats and Codes of the ISDN User Part of Signalling System No. 7*, Mar. 1993.

* cited by examiner

Primary Examiner—Wellington Chin
Assistant Examiner—Maikhanh Tran

(57) ABSTRACT

The invention relates to a communication system, method and processing means for switching calls in a transmission network (FN1, FN2) which is provided for switching calls from local networks (LN1, LN2). A special service provider (IN) performs special services for a subscriber placing a call in accordance with a received call line identification parameter (CLI). The special services are performed in accordance with subscriber profiles that can first be stored in a memory or updated. The operator of the transmission network (FN1, FN2) can therefore successively create a subscriber profile for each subscriber and handle him individually without being dependent on the local networks (LN1, LN2).

28 Claims, 11 Drawing Sheets

Fig. 4

| calling line identification (CLI) | special service parameter block marking (profile) SP |
|---|---|
| 1. 089 / 123456 | 1 |
| 2. 0211 / 535226 | 2 |
| 3. 0221 / 24082 | 1 |
| 4. 0882 / 3564 | X |
| ... ... | ... |
| n. no CLI | Z |

Fig. 5

| Bit | A | B | C | D | E | F | G | H |
|---|---|---|---|---|---|---|---|---|
| octet 1 | preselection indicator | release indicator | call limiter | space | space | space | space | space |
| octet 2 | announcement selection | | | | | | | |
| octet 3 | charging tariff | | | | | | | |
| octet n | space | | | | | | | | special service parameter block 1

Fig. 11 long distance communication system
PRIOR ART

COMMUNICATION SYSTEM, METHOD AND PROCESSING MEANS FOR SWITCHING CALLS VIA A TRANSMISSION NETWORK DISPOSED BETWEEN TWO LOCAL NETWORKS

FIELD OF THE INVENTION

The invention relates to a communication system, method and processing means for switching calls via a transmission network provided between two local networks. The telephone call is initiated by a subscriber of a first local network (e.g. in Düsseldorf) and transferred from the first local network to a remote transmission network which then switches the call to a second local network (e.g. in Munich) which then transfers the call to the target subscriber. In contrast to the local network, which is in direct contact with the subscriber and provides a service (e.g. invoicing, maintenance etc.) for him, the remote transmission network merely has the passive task of rapid switching, usually without directly accessing the two subscribers of the local networks.

The invention particularly relates to the problem of how the remote transmission network can be brought out of this purely passive state and be directly connected to the subscriber, without relying on information from the local networks.

The invention was entailed by the following considerations. In the past, the local networks as well as the transmission network were strictly and centrally managed by the same system operator, e.g. by the German Post Office. This has drastically changed, however, over recent years as a result of opening up this market for private bidders. Now it is also possible for the individual networks to be operated by different private bidders. In particular, various remote transmission networks are available too. If a new supplier wishes to launch the new remote transmission network on the market, the principal problem is always of course to entice new customers and to get them to use the new network based on attractive offers. Although this does in principle apply to the local network operators as well, such operators are able to contact new customers or subscribers directly in order to provide them with a service.

New suppliers of remote transmission networks are, however, faced with the problem of being dependent on information from the local network operators because they do not have any direct access to the subscribers. As shall be explained below, every call transferred from the local network does in fact receive an identification (a transmission network selection parameter) that the specific remote transmission network is supposed to be selected, but at the time of call initiation, the remote transmission network operator does not know which type of subscriber is calling, i.e. whether the subscriber himself or the local network has selected the specific remote transmission network.

THE INVENTION'S TECHNICAL BACKGROUND

The problems as to why the remote transmission network currently does not exhibit any access, particularly on-line access, to the local network subscribers will be described below with reference to the prior-art communication system shown in FIG. 11.

FIG. 11 shows a first local network LN1 (e.g. Deutsche Telekom), a second local network LN2 (e.g. likewise Deutsche Telekom) and two remote transmission networks FN1, FN2 for selecting the subscriber or the local network. FIG. 11 shows the case in which the call is executed from subscriber A to subscriber B via the remote transmission network FN1, while a call by subscriber B to subscriber A is performed via the other remote transmission network FN2. The individual exchanges EX (e.g. just one EX is depicted in each network, although several EX may of course be provided) switch the individual calls within the networks, with standard signaling being performed between the networks using standard protocols (e.g. ETSI ISUP Version 2 (ISDN User Part) for the SIGNALLING SYSTEM No. 7, described in ITU-T Recommendation Q.763). In the communication system in FIG. 11, there are in principle two possible ways of selecting one of the remote transmission networks FN1, FN2, viz. "by contractual preselection" and "by subscriber selection".

Transmission Network Selection by Contractual Preselection

As shown by the hatched line between A⇌FN1, subscriber A has made direct contact with the remote transmission network 1 and concluded an exclusive contract with this transmission network. Subscriber A or the remote transmission network 1 notifies this to the operator of local network LN1 so that all the calls initiated by subscriber A are directed via FN1. If subscriber A dials the desired national telephone number NDC of target subscriber B, the local network then looks up in a local memory 1-1 whether a specific preselection for the remote transmission network was made on behalf of subscriber A. In this instance, memory 1-1 indicates that FN1 is to be used. The local network together with a call set-up parameter block NDC, CSP1, CLI transfers the call set-up request to the remote transmission network 1. In other words, the local network adds a prefix CSP1 to the national telephone number NDC, whereby CSP1 is the transmission network selection parameter envisaged for FN1. A call line identification parameter CLI identifying the subscriber station or subscriber from whom the call set-up request originates is also transferred by the local network. Since the remote transmission network FN1 already contains information on subscriber A in an intelligent device IN for concluded contracts, it can identify subscriber A when a so-called black-and-white checking test is performed using a corresponding REG content. If a match exists, the remote transmission network FN1 is able to transmit the bill for the exchange directly to the subscriber.

Transmission Network Selection by Subscriber Selection

In contrast thereto, subscriber B deliberately chooses the remote transmission network FN2 during call initiation, whereas he has not previously concluded any contract with this network. Subscriber B himself inputs a preselection by means of the transmission network selection parameter CSP2 together with the national telephone number NDC so that the local network LN2 knows that the call from subscriber B has to be directed after FN2. Like the FN1 network, the remote transmission network FN2 also receives in this instance a call set-up parameter block consisting of NDS, CSP2, CLI. The remote transmission network FN2 does not, however, find any kind of entry whatsoever in its intelligent device IN, because a contract with subscriber B does not yet exist. In this case, FN2 has to transfer the bills for settlement of accounts to the local network LN2 and does not have any direct access to subscriber B whatsoever. In other words, in instances where the standard transmission network selection parameter CSP is overwritten by a parameter CSP2 set by the subscriber, the operator of the local network LN2 and the operator of the remote transmission network FN2 have to have reached contractual agreements.

This approach is not especially advantageous because a new operator of a new remote transmission network therefore always relies on cooperation with the local network operator. The only option available to the remote transmission network operator is simply not to permit the call, which is in turn far from beneficial since the remote network operator is after all dependent on customers. The only active intervention is therefore restricted to the black-and-white checking test shown in FIG. 12.

Black-and-white Checking Test

In step S1, the remote transmission network FN1, FN2 reads the call line identification parameter CLI and decides in step S2 whether a test is to be performed using a black list or a white list. The black list contains entries about subscribers on whose behalf a contract has been concluded, whereas the black list contains entries for subscribers who have not concluded a contract. The left and right branches in FIG. 12 are therefore analog.

If a corresponding entry indicating that a contract has been reached with a subscriber is found in step S3 or S4, the call can be switched and processed (steps S5, S6). If no corresponding entry is found, the only solution available in the prior art is to release the call (steps S5, S6). As already mentioned, merely releasing the call is not a good way of economically operating the remote transmission network, thus leaving the operator no choice but to be compelled to process this call instead of releasing it and then to use the local networks to enter into contractual processing. But this is extremely restrictive and limits flexibility on a fiercely competitive market.

In conventional terms, the remote transmission network's active option of decision making therefore did not go beyond a simple YES/NO decision about these fundamental types of call (call with a transmission network selection "by contractual preselection" or "by subscriber selection"). In principle it was indeed feasible for the remote transmission network operator to contact the local network operator at predetermined periods of time (e.g. once a month), possibly in order to obtain information on any subscribers already negotiated. Once again, however, he is dependent on the local network operator's assistance and in particular he does not receive any on-line information, i.e. exactly when the call is being set up.

DESCRIPTION OF THE PRIOR ART

As already described in relation to FIG. 11, standard protocols such as ISUP are used between the remote transmission network and the local network. The addition of the CSP parameter has already been discussed in the "Signaling for Interconnection" national working group for the German market; this parameter is based on the Transit Network Selection parameter TSN described in ITU-T Recommendation Q.763 (see also specification "carrier selection"; interface specification "Signaling in ZZN7"; version 1.1.0; ITU-T Q.763 "Format and Codes of the ISDN User Part).

In order for the remote transmission network operator to receive information on whether the remote transmission network "by subscriber selection" ("call-by-call selection") or "by contractual preselection" ("preselection") was chosen, the current proposal is to extend the CSP parameter so that it contains information on the type of selection, i.e. about how to go about selecting the remote transmission network.

But the problem is that a standardized ETSI ISUP version 2 used between the remote transmission networks and national networks has to be modified by a special parameter for national use. All the system operators working on the German market must therefore implement this parameter and every local network operator has to store in a memory the parameter's contents for each subscriber belonging to this network.

Yet altering the national protocols requires the consent of the exchange systems suppliers and entails changing the signaling at the exchange systems, which cannot be performed in a short time or without considerable outlay. Since alterations also have to be performed in a highly sensitive area, namely switching center call control or the protocol, it cannot be expected that well-established national protocols will be altered in the near future simply at the request of the remote network operators.

SUMMARY OF THE INVENTION

As far as the remote network operator is concerned, the aforementioned disadvantages consequently remain, viz. that he is dependent on the local network operators' cooperation in order to ascertain whether new subscribers would like to test out the new remote transmission network even without a contract, for example on a trial basis,.

The invention's object is therefore to provide a communication system, method and processing means within a remote transmission network which enable the remote transmission network operator to ascertain information on the type of call without altering the interface protocols and without being dependent on the local network operators' assistance.

The Object's Solution

This object is solved by a communication system for switching calls between a first subscriber station of a first local network and a second subscriber station of a second local network via at least one transmission network provided between the local networks and comprising at least one switching center connected to the first and second local networks, with the at least one switching center receiving a call set-up parameter block with at least one call line identification parameter every time there is a subscriber station call set-up request from the respective local network; this parameter identifies the subscriber station from which the call set-up request originates, with the transmission network comprising at least one special service provider connected to the at least one switching center for receiving at least the call line identification parameter of the call set-up parameter block from the switching center when there is a subscriber station call set-up request; and for performing special services for the subscriber station making the call in accordance with the received call line identification parameter.

This object is also solved by a method of switching calls between a first subscriber station of a first local network and a second subscriber station of a second local network via at least one transmission network provided between the local networks and comprising at least one switching center connected to the first and second local networks, with the at least one switching center receiving a call set-up parameter block with at least one call line identification parameter each time there is a subscriber station call set-up request from the respective local network; this parameter identifies the subscriber station from which the call set-up request originates, whereby a special service provider connected to the at least one switching center of the transmission network receives at least the call line identification parameter of the call set-up parameter block from the switching center when there is a subscriber station call set-up request; and special services are performed for the subscriber station making the call in accordance with the received call line identification parameter.

The object is also solved by processing means in a transmission network for switching calls between a first subscriber station of a first local network and a second subscriber station of a second local network having at least one switching center for a connection with the first and second local networks, whereby each time there is a subscriber station call set-up request from the respective local network, the switching center receives a call set-up parameter block with at least one call line identification parameter that identifies the subscriber station from which the call set-up request originates, with the processing device comprising a special service provider connected to the at least one switching center for receiving at least the call line identification parameter of the call set-up parameter block from the switching center when there is a subscriber station call set-up request; and for performing special services for the subscriber station making the call in accordance with the received call line identification parameter.

The object is also solved respectively by each of the claims 34–41. According to the invention, the transmission network comprises a special service provider which performs special services when there is a call set-up request instead of YES/NO test, as described above, in accordance with the received call line identification parameter CLI. These special services may for example be active functions or programs that also make it possible to handle subscribers who have not yet concluded a contract with the network operator. The remote network's function is therefore no longer exclusively limited to the passive exchange of calls, but an active intervention in the call that is taking place can even be performed. By consequently having functions or programs performed in the remote transmission network itself, viz. Merely in accordance with the call line identification parameter CLI (which is in any case transferred by the standard protocols), it is no longer necessary to cooperate with the local networks.

To perform special services efficiently, the special service provider may comprise memory means in which a specific special service parameter block is stored for each subscriber of a local network connected to the remote transmission network. This parameter block may be a set of standard special service parameters that is set once a contract has been concluded, or a parameter block which was updated or set for the first time during a renewed call (also in dialog with the subscriber). As soon as a subscriber may wish to test out the remote transmission network just for initial test purposes, the remote transmission network is therefore immediately able to store a parameter block which can then be successively updated when the same subscriber makes renewed calls. The remote transmission network therefore operates self-sufficiently without being dependent on the assistance of the local network operators.

The following are examples of special services that can be performed as programs or functions on the basis of the special service parameter blocks: forwarding a message, advertising or music to the subscriber placing a call; controlling a calculation of fees; performing a bidirectional on-line dialog with the subscriber placing a call; sending information material to the subscriber making a call; limiting the call time; interrupting the call at predetermined intervals of time in order to play advertising/messages or music during the breaks; forwarding bills or application forms to the subscriber making a call; producing statistics; producing itemizations of calls made via the transmission network; controlling the transmission network's transmission speed for the call to be performed; automatically calling back the subscriber at predetermined intervals of time; and forwarding messages to the subscriber who has been called.

In relation to the communication system, method and processing means, it is advantageous for the transmission network to comprise at least two gateway switching centers each connected to the first and second local networks, for the gateway switching centers to receive the call set-up parameter block and for the special service provider to be connected to the gateway switching centers and to receive the call set-up parameter block when there is a call set-up request from one of the gateway switching centers.

In relation to the communication system, method and processing means, it is advantageous for the call set-up parameter block to comprise, in addition to the call line identification parameter, a transmission network selection parameter, whereby the switching center determines on the basis of the transmission network selection parameter whether the transmission network is selected for exchanging the call.

In relation to the communication system, method and processing means, it is advantageous for the local network to select a transmission network envisaged for transmission of the call initiated by the subscriber station and composed of a plurality of transmission networks in accordance with a concluded contract between the subscriber station and the transmission network operator, and to set the transmission network selection parameter correspondingly (transmission network selection by contractual selection).

In relation to the communication system, method and processing means, it is advantageous for the subscriber himself to select a transmission network envisaged for transmission of the call initiated by the subscriber station and composed of a plurality of transmission networks, and to set the transmission network selection parameter correspondingly (transmission network selection by subscriber selection).

In relation to the communication system, method and processing means, it is advantageous for the switching center to comprise means in which are first stored call line identification parameters that identify specific subscribers and/or subscriber stations whose calls are permitted for transfer via the transmission network by contract between the transmission network operator and the subscriber and/or subscriber station and, when there is a call set-up request, for the switching station to compare the received call line identification parameter with the stored call line identification parameter and to permit the call to be set up or exchanged when a match is established (calls with transmission network selection by contractual preselection) and to block it when no match is established (call with transmission network selection by subscriber selection).

In relation to the communication system, method and processing means, it is advantageous for the switching center to transmit the call set-up parameter block to a special service control device of the special service provider which comprises memory means in which call line identification parameters are first stored that identify specific subscribers and/or subscriber stations whose calls are permitted for transfer via the transmission network by contract between the transmission network operator and the subscriber and/or the subscriber station (calls with transmission network selection by contractual preselection) and, when there is a call set-up request, for the special service control means to compare the received call line identification parameter with the stored call line identification parameters and to perform special services during a call set-up when no match is established (call with transmission network selection by subscriber selection).

In relation to the communication system, method and processing means, it is also advantageous for the special service control means to perform special services during call set-up when a match is established (call with transmission network selection by contractual preselection).

In relation to the communication system, method and processing means, it is advantageous for the special service provider to comprise memory means in which a special service parameter block (1, 2, x, z) is stored for each call line identification parameter, indicating the special services to be performed for a subscriber and/or subscriber station exhibiting the respective call line identification parameters.

In relation to the communication system, method and processing means, it is advantageous—with regard to subscribers and/or subscriber stations who conclude a contract directly with the transmission network operator—for the special service control device, on conclusion of a contract, to select one of several standard special service parameter blocks and to store it in the memory means as the associated special service parameter block for the respective call line identification parameter, whereby on reception of the associated call line identification parameter, the special service control means performs the special services indicated by this special service parameter block.

In relation to the communication system, method and processing means, it is advantageous for the special service control means—when it does not establish any match—to select one of several standard special service parameter blocks, to perform the special services indicated therein and then to store this or another standard special service parameter block as a special service parameter block together with the associated call line identification parameter in the memory means.

In relation to the communication system, method and processing means, it is advantageous for the special service control means to update the parameters in the special service parameter block on reception of the associated call line identification parameter and/or to assign a new special service parameter block to the call line identification parameter.

In relation to the communication system, method and processing means, it is advantageous for the special service control means to update the existing special service parameter block or to re-assign a new such parameter block by means of data communication means which performs interactive communication with the calling subscriber or subscriber station.

In relation to the communication system, method and processing means, it is advantageous for the special services to be selected from the group comprising one or more of the following special services: forwarding a message, advertising or music to the subscriber placing a call; controlling a calculation of fees; performing a bidirectional on-line dialog with the subscriber placing a call; sending information material to the subscriber making a call; limiting the call time; interrupting the call at predetermined intervals of time in order to play advertising/messages or music during the breaks; forwarding bills or application forms to the subscriber making a call; producing statistics; producing itemizations of calls made via the transmission network; controlling the transmission network's transmission speed for the call to be performed; automatically calling back the subscriber at predetermined intervals of time; and forwarding messages to the subscriber who has been called Other advantageous embodiments and improvements of the invention are indicated in the dependent claims. The invention will be described in the following by way its embodiments with reference to the drawings. Identical reference numerals and symbols designate identical or similar parts in the drawings.

A BRIEF DESCRIPTION OF THE DRAWINGS

FIG. 2-1 shows a flow chart of the general operation of the special service provider IN from FIG. 1;

FIG. 2-2 shows a flow chart of how various special service programs are called up in accordance with parameter blocks or "profiles" assigned to an ascertained CLI;

FIG. 4 shows an embodiment of a Table representing a correlation between markers for special service parameter blocks and call line identifiers;

FIG. 5 shows an embodiment of a special service parameter block;

Figure 11:
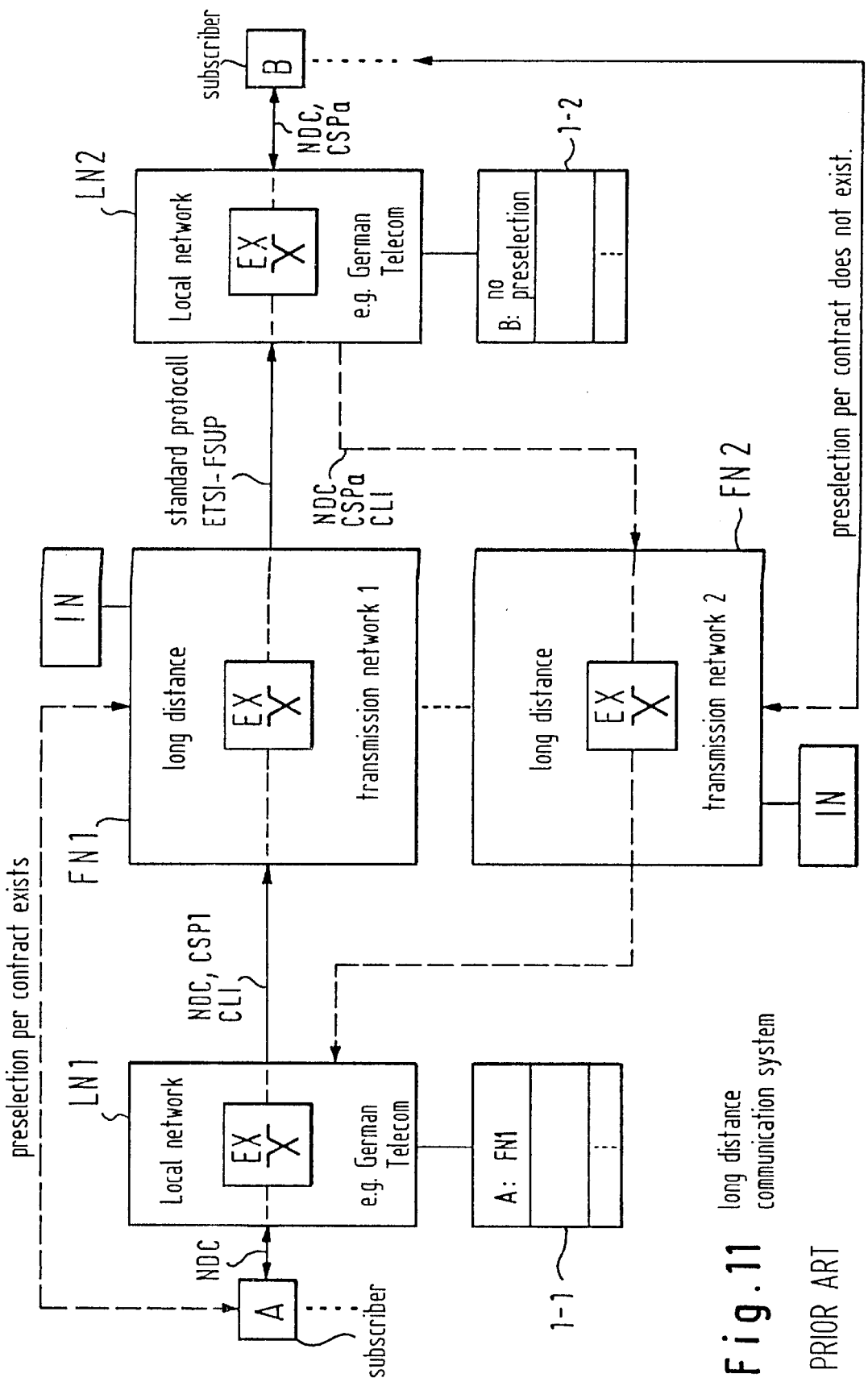
Figure 12:
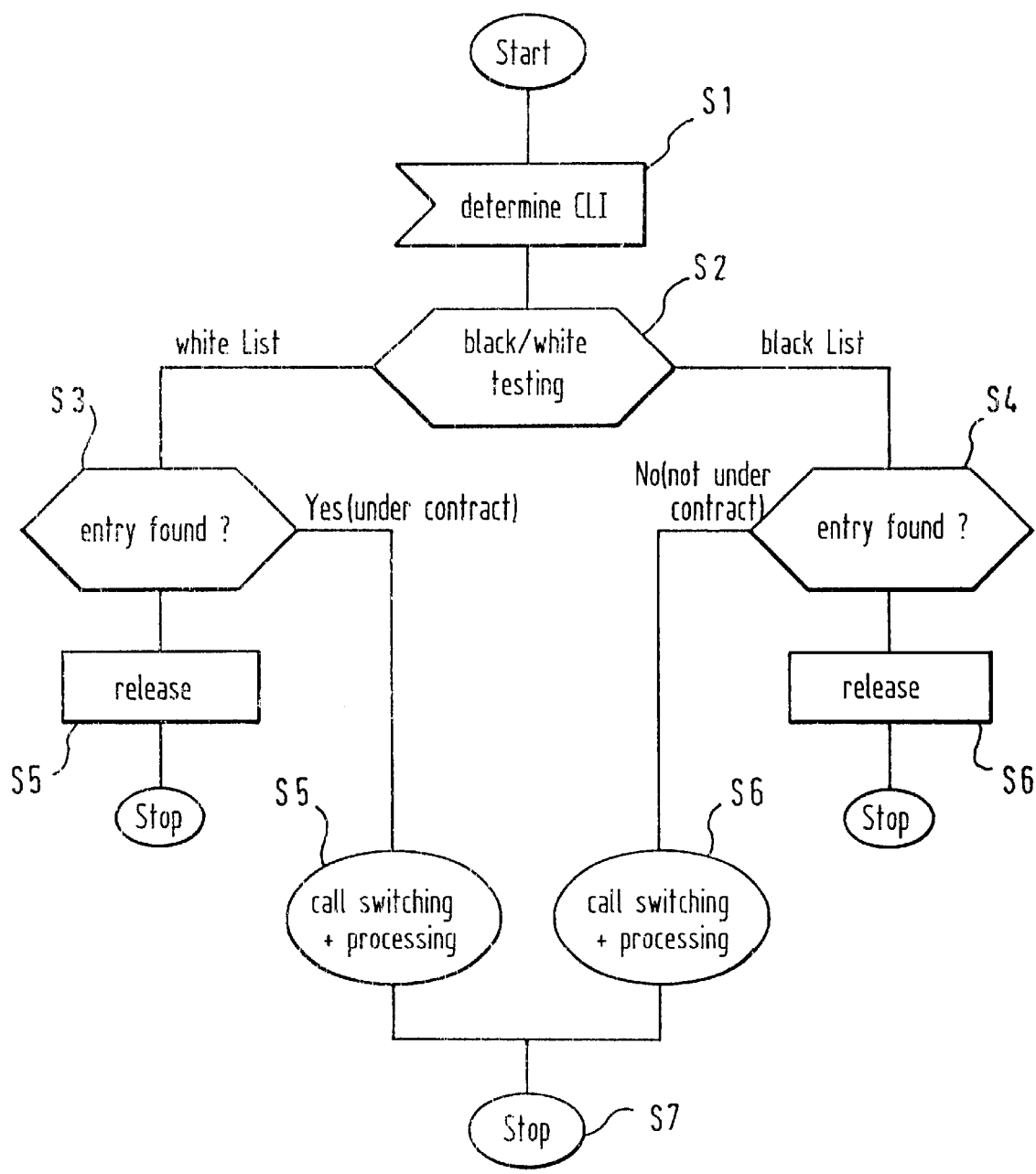

FIG. 11 an overview of a remote transmission communication network according to the prior art; and FIG. 12 a flow chart of a prior-art black-and-white test.

DESCRIPTION OF THE PREFERRED EMBODIMENTS

Figure 1:
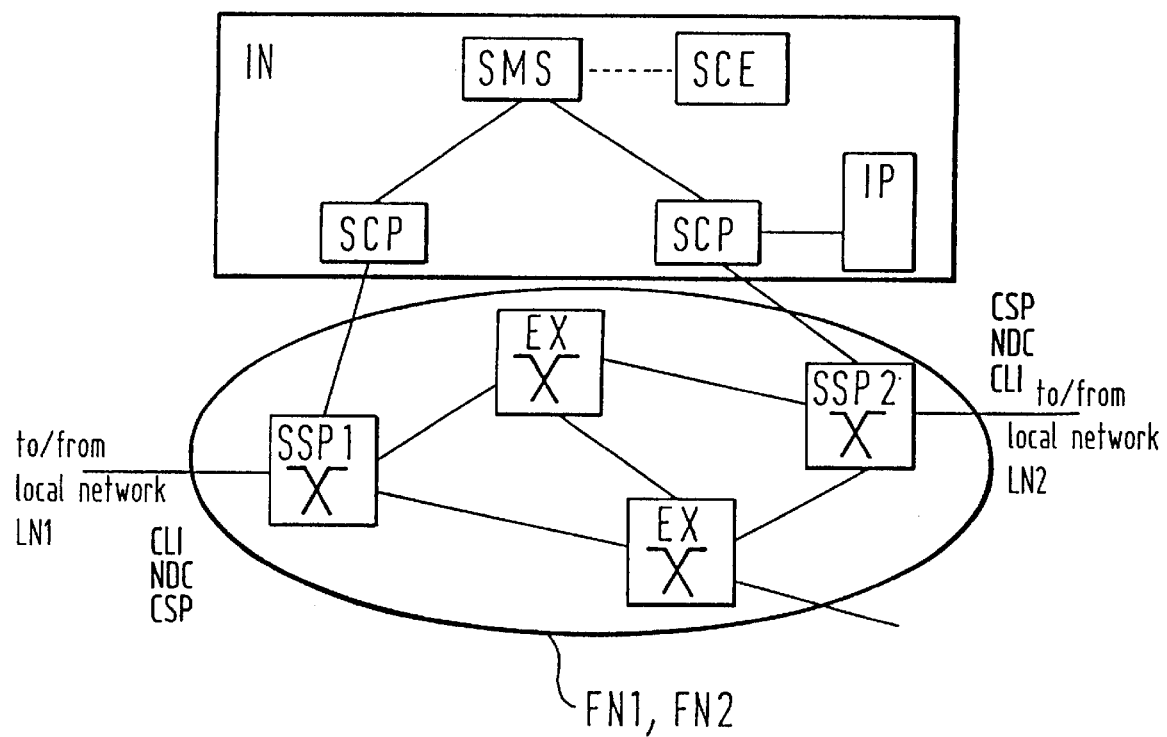
FIG. 1 shows a remote transmission network FN1, FN2 with an embodiment of the special service provider IN according to the invention.

FIG. 1 shows a remote transmission network FN1, FN2 comprising a special service provider IN according to the invention. in this embodiment, the remote transmission network is connected at the gateway switching centers SSP, SSP2 to the local networks LN1, LN2 shown in FIG. 11. Other switching centers EX serve to exchange calls within the remote transmission network. Whereas the gateway switching centers SSP1, SSP2 in the prior art were used only for the black-and-white test, it is provided according to the invention for the special service provider IN to receive at least the call line identification parameter CLI from the gateway switching center. It may also receive the national telephone number NDC and the transmission network selection parameter CSP.

By way of example, the device FN in FIG. 1 is connected to the gateway switching centers SSP1, SSP2. Although the following description refers to FIG. 1, the device IN may, according to another embodiment of the invention, be connected to one (or any number of) switching centers EX which, during call set-up, transfer the call set-up parameters, particularly CLI, to the device IN, whereupon the special services are performed. The arbitrary switching center EX then becomes the switching center SSP.

In contrast to a black-and-white test, the device IN performs, in accordance with the received call line identification parameter, special services for the very call that is to be set up. In other words, after the switching center SSP1, SSP2 has determined the CLI in step S1 shown in FIG. 2, it transmits the CLI in step S11 to the device IN which receives the CLI in step S12. The special services that are specifically assigned to the received CLI are performed by the device IN in step S13. As will be explained below in further detail, it is possible to perform a special service directly in accordance with the CLI (namely when information about CLI is already present in the device IN), or it is possible first to process the CLI in order to determine the type of call "by preselection" or "by subscriber selection", whereupon the special services are performed in accordance with the type of call (this concerns the case when the device IN does not yet exhibit any information for a recently received CLI).

The special services themselves do not, however, concern the black-and-white test explained in FIG. 12. The black-and-white test may in fact be a preliminary stage before commencing with the performance of special services. In contrast to a pure YES/NO decision such as in the black-and-white test method, special services are therefore actual functions, programs or operations that are performed in response to the received CLI for the very call that is to be set up. In response to the received CLI, the special services may also control the transmission network itself, e.g. for setting the transmission rate, the times at which fees are settled etc. A special service therefore performs a genuine function or program for the received call set-up request. In particular, calls from subscribers who have not yet concluded a contract with the remote transmission network operator are not simply rejected (NO in the black-and-white test), but are handled further in the flexible CLI special service program. The call is released or processed further only after such treatment (e.g. a message is issued, a bidirectional dialog is held with the subscriber placing the call). Even if the call is released, the device IN is able to store information on the fact that a specific caller of a specific CLI has already attempted ("by subscriber selection") to visit the transmission network. If the same subscriber calls again, this information can already be used to perform another special service for the subscriber making another call. The device IN can therefore ascertain successive information about subscribers.

The following are examples of embodiments of the special services that are performed by the device IN: forwarding a message, advertising or music to the subscriber placing a call; controlling a calculation of fees; performing a bidirectional on-line dialog with the subscriber placing a call; sending information material to the subscriber making a call; limiting the call time; interrupting the call at predetermined intervals of time in order to play advertising/messages or music during the breaks; forwarding bills or application forms to the subscriber making a call; producing statistics; producing itemizations of calls made via the transmission network; controlling the transmission network's transmission speed for the call to be performed; automatically calling back the subscriber at predetermined intervals of time; and forwarding messages to the subscriber who has been called.

Performing the special services in accordance with the received call line identification parameter CLI therefore enables the network operators in an inexpensive and flexible manner to incorporate new subscribers into their network and particularly to remain independent of the national or international standards. There is no need to alter the protocols in the signaling systems and the approach is also independent of standardization committees such as ETSI and ITU-T. The operator can freely select his preferred service program by using the device IN without being dependent on cooperation with the national or local networks. Only by identifying the CLI and further processing in accordance with the identified CLI can the device IN therefore render the remote transmission network operator independent of the requirements of the local networks, enabling him to adapt his own services more effectively to the requirements of new subscribers, thus allowing more flexible competition.

Structure of the Special Service Provider IN

As shown in FIG. 1, the device IN comprises special service control means SCP, a special service handling system SMS that controls the SCPs and manages data within the SCPs, a special service generation unit SCE and an intelligent processor IP which can perform a bidirectional dialog (e.g. via DTMF) with a subscriber who is placing a call. A number of special service parameter blocks (subscriber profiles) and an assignment table are stored, for example in the SCP or SMS. An example of the table SP and of a special service parameter block is shown in FIG. 4 and FIG. 5.

When a gateway connection center SSP (or an arbitrary switching center EX connected to IN) registers the call set-up request, the necessary data are sent to the special service control means SCP which runs through the special service in real time. After determining the type of call, i.e. "by preselection" or "by subscriber selection", the special service control means can perform one or more programs in accordance with the specific type of call (i.e. the specific subscriber profile) in real time. Examples of such programs performed in real time include:

1. Playing a message, e.g. an advertisement at the time of call set-up.
2. As the call is being made, interrupting it once or several times for a message or advertisement.
3. Supplementing the call time for a call with transmission network selection "by subscriber selection".
4. Storing various information about account statements for different subscribers.
5. Setting different fees (e.g. when the caller is a new subscriber, no fee is calculated for the first call and the subscriber is notified of this on-line).
6. Generating information at the special service handling unit SMS which
   sends out bills for calls "by subscriber selection",
   sends out a membership application to subscribers who have not yet signed a contract with the operator.
   Such an SMS unit might be an automated news station or a simple office staffed by people who attend to sending out this material.
7. Generating statistical itemizations, i.e. evaluations about the number and type of callers.

The special services can be handled and performed in a flexible manner by using special service parameter blocks (subscriber or caller profiles), as will be explained below.

Description of the Special Service Parameter Blocks

FIG. 4 shows a table SP which is present e.g. in a memory in the SCP or SMS of the device IN. Individual special service parameter block markers 1, 2, 1, x . . . z are assigned to individual call line identifiers CLI. Each marker indicates a specific special service parameter block which is depicted for example in FIG. 5. For instance, the entries 1, 3 exhibit the same type of special service parameter block, e.g. a standard special service parameter block for "telephoning with standard fees and standard time during the day". The second entry 2 indicates a parameter block with the marker 2, e.g. a parameter block with "advertising messages and a limited call time". The assignment has already been made in the first four entries 1, 2, 3, 4, e.g. as a result of a contract concluded between the subscriber and operator or as a result of setting the parameter block the first time the subscriber calls, when he wishes to use the remote transmission network for the first time "by subscriber selection". As will also be explained below, the table SP may exhibit fixed assignments only, such as in the entries 1, 2, 3, 4, and may not at all exhibit any assignment of a parameter block for "no CLI", or it may also exhibit an entry n which specifies a pre-defined parameter block whenever a CLI has not yet been handled, i.e. when an unknown subscriber calls for the first time "by subscriber selection". Such a parameter block is designated by z.

A typical parameter block stored for each CLI or for a missing CLI (Z) is shown in FIG. 5. In bit A, the octet 1 contains a preselection indicator indicating whether the CLI (or the subscriber) is one who has already concluded a contract "by preselection" or whether it relates to one who has chosen the transmission network "by subscriber selection". Bit B is a "trigger indicator" indicating whether the call is to be rejected or handled further. Bit C indicates for instance a call restriction, e.g. a limited call time. Other bits D, E, F, G, H can be used for other settings such as predetermined rates of fees, exchange speeds etc.

Octet 2 indicates for example a message portion that can be selected from 256 different messages. Octet 3 indicates the current fee tariff and other octets can be used to extend the profile with further information. These parameter blocks can be set the first time the subscriber places his call and can be updated with new information when calls are repeated, e.g. when a caller makes frequent calls, the fee tariff is automatically changed.

Figures 1, 2:
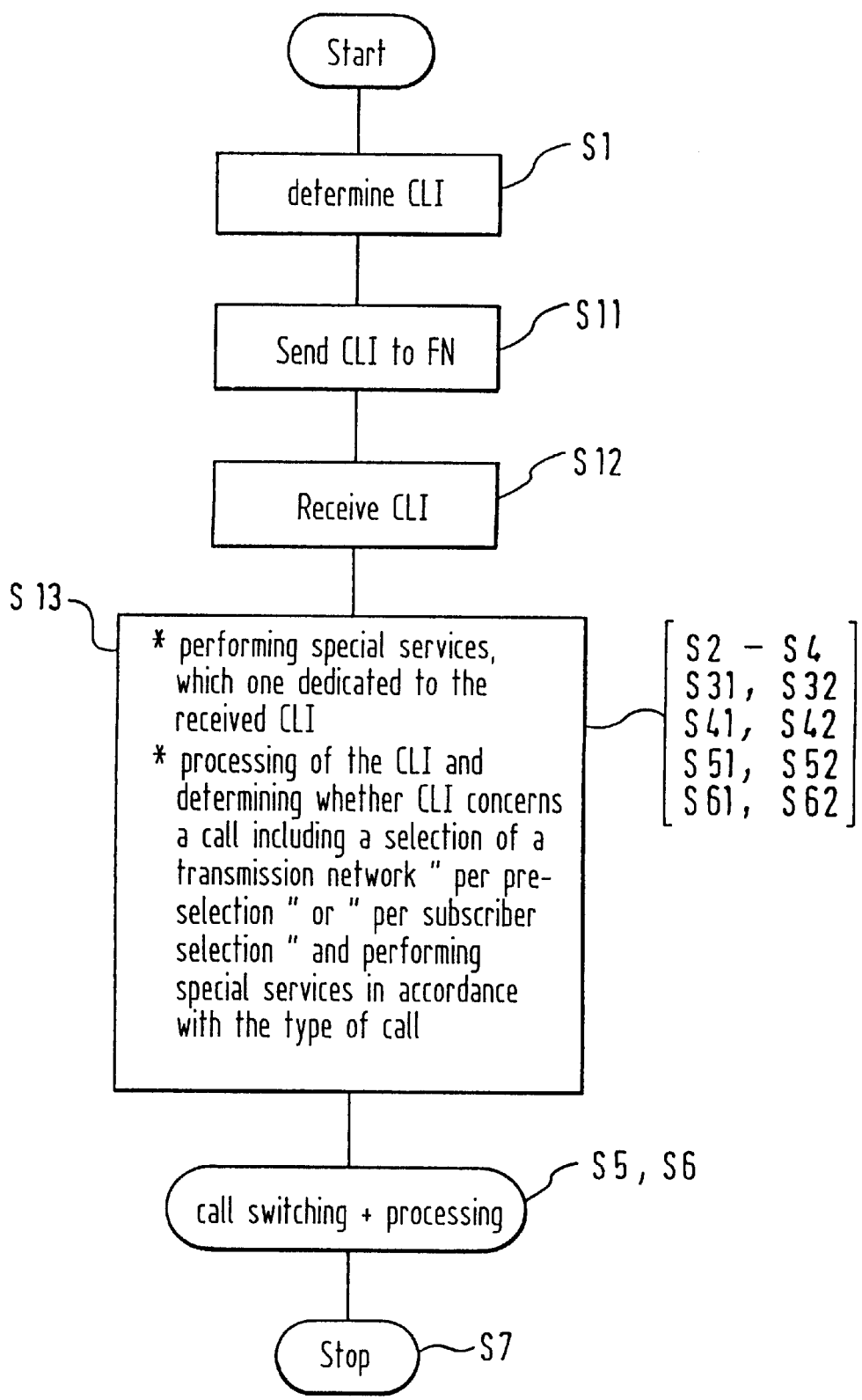
Figure 2:
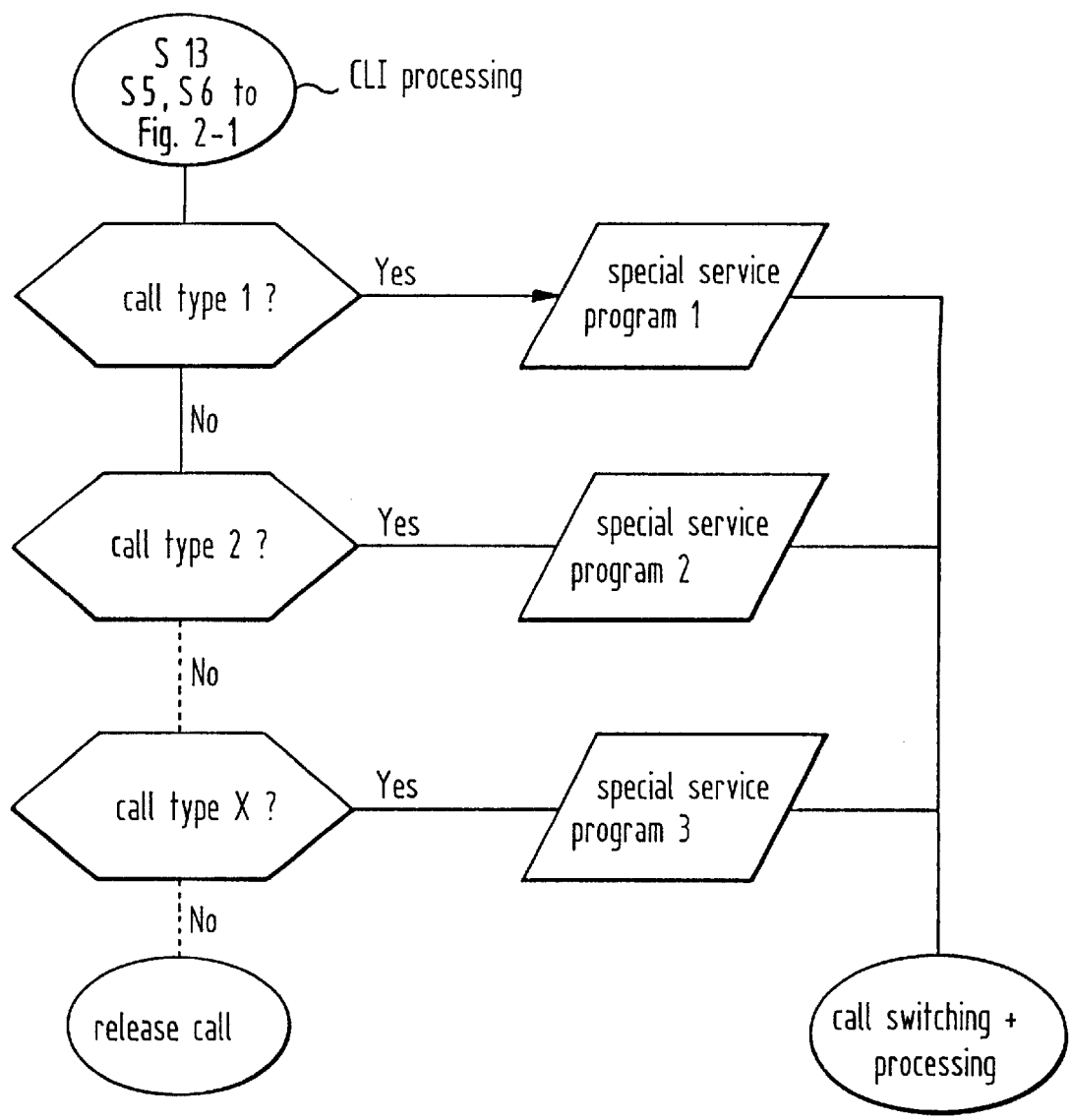

A specific "profile" can therefore be set for each caller and successively updated. Depending on the parameters set in the parameter blocks, the device IN or the device SCP then performs various special services in accordance with the "subscriber profile" generated in this manner, as shown in FIG. 2-2.

Figure 3:
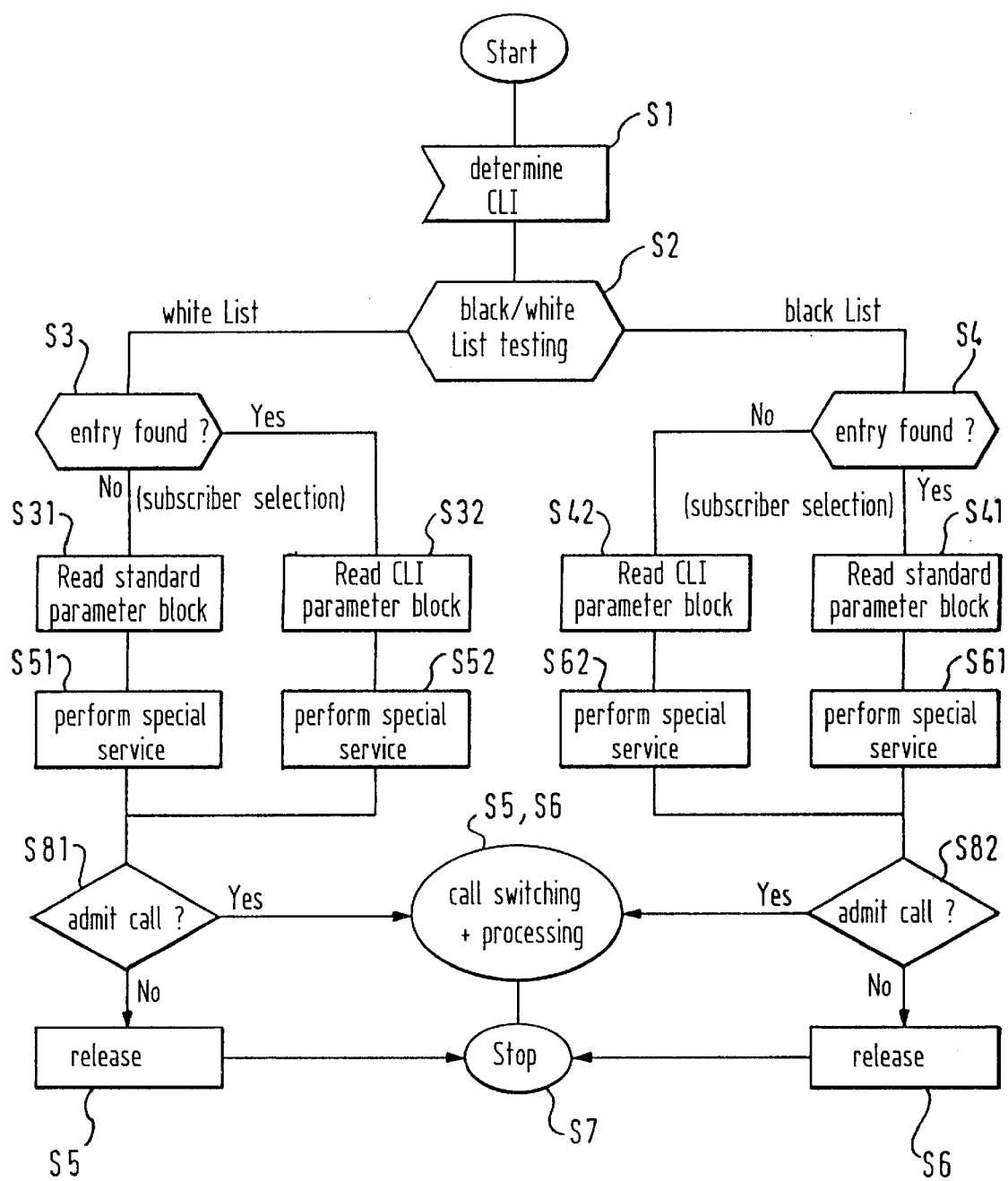
FIG. 3 shows a more detailed flow chart of the operation of the invention's special service provider IN, with special service parameter blocks being processed in accordance with the received call line identification parameter CLI, according to an embodiment of the invention.

By providing the assignment table SP and the parameter blocks as shown in FIGS. 4 and 5, it is therefore possible to eliminate the black-and-white test completely, since a specific caller profile is assigned to each incoming CLI, with the special services set therein being performed in accordance with this caller profile. This corresponds to the first alternative in step S13 in FIG. 2-1. In this instance, steps S2, S3, S4 in FIG. 3 are not performed, causing the subscriber profile or the CLI parameter block in steps S32, S41 to be directly read and the special services to be performed afterward. In an instance in which an entry n is not, however, provided in the assignment table SP, the black-and-white test can also be used, as depicted in FIG. 3, whereby in the event of a non-existent entry n in steps S3, S4, a standard parameter block with pre-defined bits A–H and octets 1–n is first called up. In other words, a pre-defined standard caller profile or caller format is assigned to an unknown subscriber.

Figure 9:
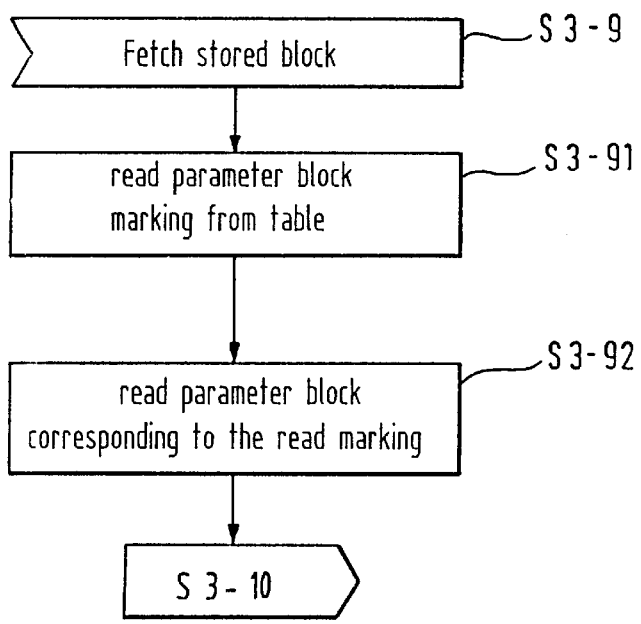
FIG. 9 shows a flow chart indicating the process of reading the special service parameter blocks according to FIGS. 4 and 5.

As shown in FIG. 9, each time a parameter block is called up, the marker from table SP is first read; this marker then indicates the corresponding parameter block (see steps S3-91, S3-92 in FIG. 9).

Generation of special service parameter blocks and their on-line updating will be described below by referring to a few examples.

Setting Special Service Parameter Blocks

Figure 6:
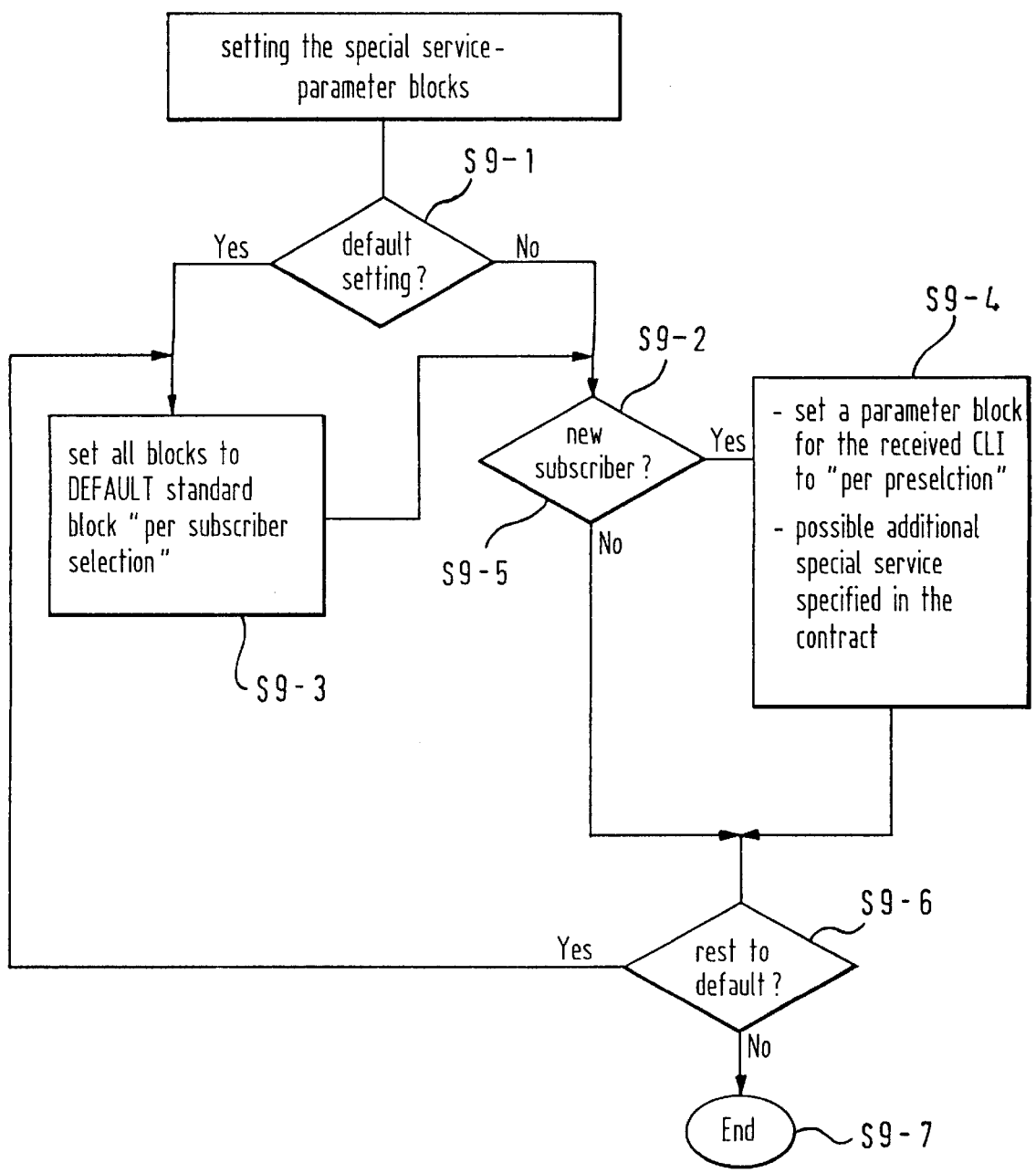
FIG. 6 shows a flow chart for adjusting special service parameter blocks before installing the remote transmission network or during a readjustment in remote transmission network mode.

FIG. 6 shows a flow diagram for setting special service parameter blocks, as depicted in FIG. 5. Such a setting may be performed at regular intervals, e.g. when concluding a new contract, or when installing the transmission network for the first time.

Setting all the subscribers to a standard parameter block is performed in steps S9-1 and S9-3, when this is desired in step S9-1. The subscriber numbers, i.e. the call line identification parameters, of the cooperating local networks are nowadays available as data records on CD ROMs (electronic telephone directories). A standard parameter block may for example be one in which the preselection indicator is set to "by subscriber selection" and a specific message portion and fee tariff are pre-set. If a new subscriber is then identified in step S9-5 on concluding a contract, the parameter block for this new subscriber (or for this new CLI) can be set to "by preselection" and additional parameters and special services set for a new subscriber. If no standard setting is performed in step S9-1, parameter blocks are merely set "by contract", e.g. the entries 1, 2, 3, 4 in FIG. 4. The remainder can then be set in step 9-6 to the standard parameter block in step S9-3, or no parameter block whatsoever is set for subscribers who have not concluded any contract (see step S9-7).

The flow chart in FIG. 6 can therefore be used to define three types of special service parameter blocks, viz. just standard parameter blocks for all the known telephone numbers, just parameter blocks for those telephone numbers that have concluded a contract and no entries for the remainder, and parameter blocks for all those telephone numbers that have concluded a contract and the remaining known telephone numbers by pre-adjustment to a standard parameter block. In the third case, a minimum amount of information is already present for example for all the known telephone numbers (from the electronic directory) so that steps S2, S3, S4 in FIG. 3 can be omitted, because a parameter block or profile is always present for a CLI even if it merely indicates that the subscriber has not yet concluded a contract, i.e. the call profile is "by subscriber selection".

Updating a Standard Parameter Block

Figure 7:
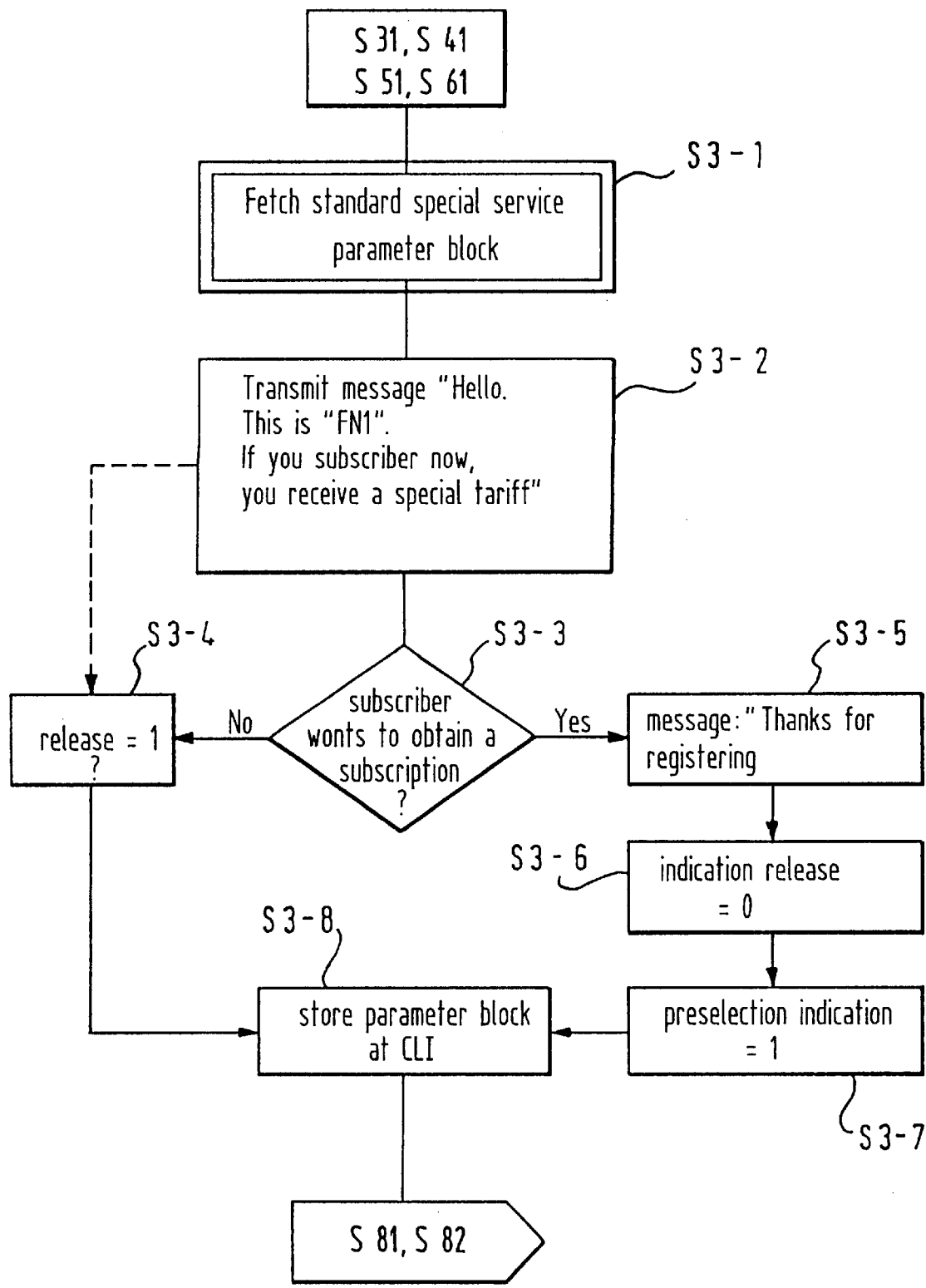
FIG. 7 shows a flow chart indicating the special service provider's operation when a special service parameter block for a subscriber is not yet present in the memory means.

FIG. 7 shows an example of how a standard parameter block can be updated the first time a new subscriber makes a call.

The standard parameter block in which the preselection indicator is set to 0, i.e. a contract has not yet been concluded for the currently calling CLI, is fetched in step S3-1. In step S3-2, the subscriber making a new call is played a message, e.g. a request to become a subscriber to the transmission network. If the subscriber, possibly in dialog mode in DTMF, decides that he does not want to become a subscriber, the cancellation indicator is set to 1 in step S3-4, which indicates the call's rejection. At the same time, the fact that the subscriber has already tried to use the network can be recorded statistically, with the result that he is greeted with a different message the next time. If the subscriber wishes to register, a corresponding message can be sent to him in steps 3-3 and S3-5, according to which the trigger indicator is set to 0, i.e. the call is to be handled further. Since the subscriber has now concluded a contract, the preselection indicator is set to 1 in his parameter block in step S3-7, indicating that the subscriber is now one with a contract. The parameter block is then updated in the memory MEM when there is a corresponding CLI.

Updating a Parameter Block

Figure 8:
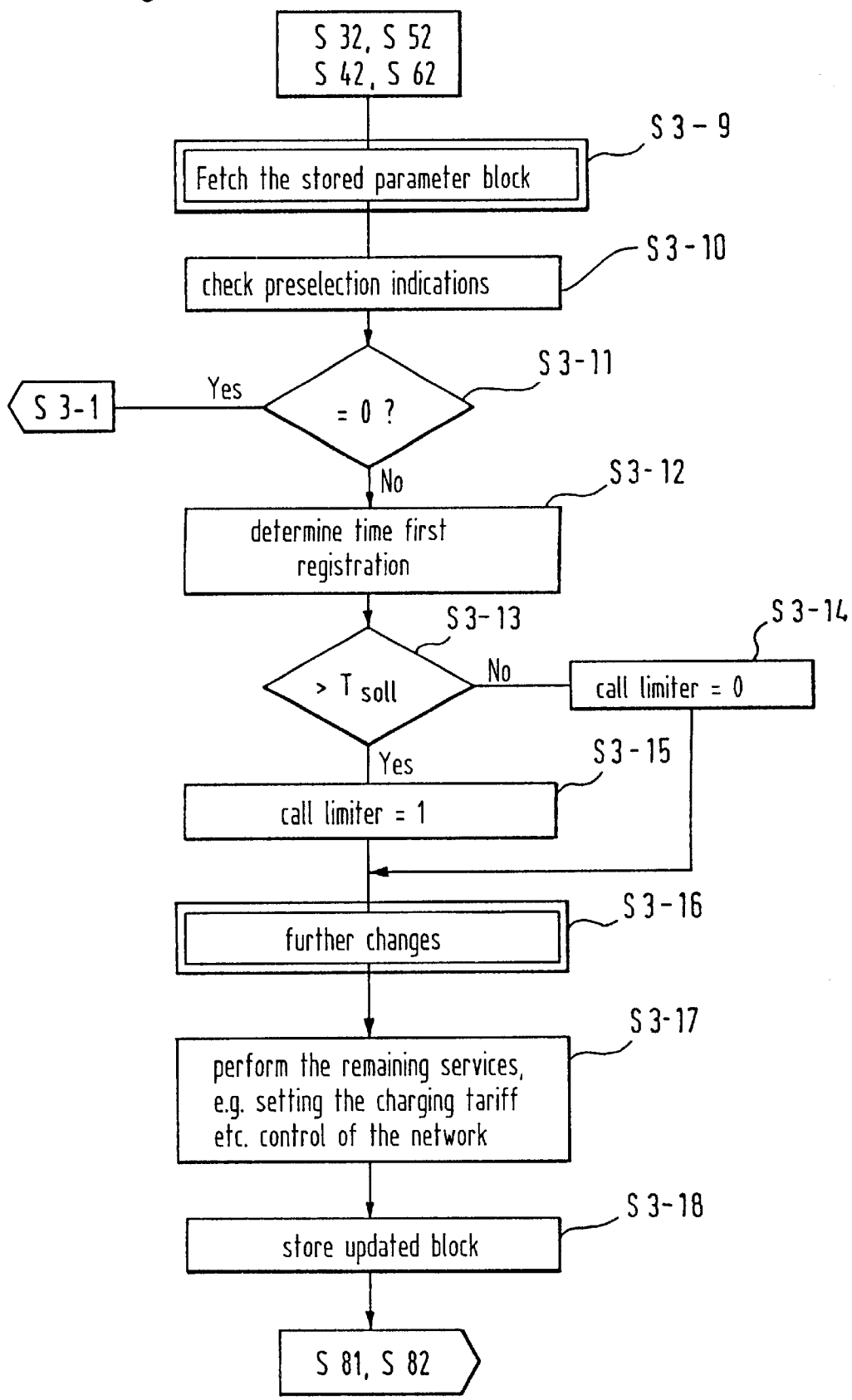
FIG. 8 shows an embodiment of the special service provider's operation when a special service parameter block for a subscriber is already present in the memory.

FIG. 8 shows an example in which a parameter block already present in the memory is updated. A stored parameter block is fetched in step S3-9 and the preselection indicator checked in step S3-10. If the preselection indicator is 0 in step S3-11, a parameter block was in fact present in the memory MEM, but it is either a standard parameter block before conclusion of a contract or a parameter block in which the contract has expired. If it is 0, the routine in FIG. 7 must therefore be performed by resetting the standard parameter block.

In step S3-11, N means that a contracted subscriber is placing a call. In step S3-12, the time of initial registration can for example be checked and compared with an initial registration time $T_{soll}$ ($T_{ref}$) in step S3-13. Once the initial registration time $T_{ref}$ has lapsed, a call time can be limited, whereby a call limiter in bit C is set to 0 or 1 in step S3-14 or step S3-15 respectively. After checking further changes in step S3-16, new fee tariffs or transmission speeds of the transmission network can then be controlled in step S3-17. The updated parameter block is then stored anew in step S3-18. In consequence, the individual profile or format for a caller can also be changed over time.

Altering the Parameter Block when the Contract Expires

Figure 10:
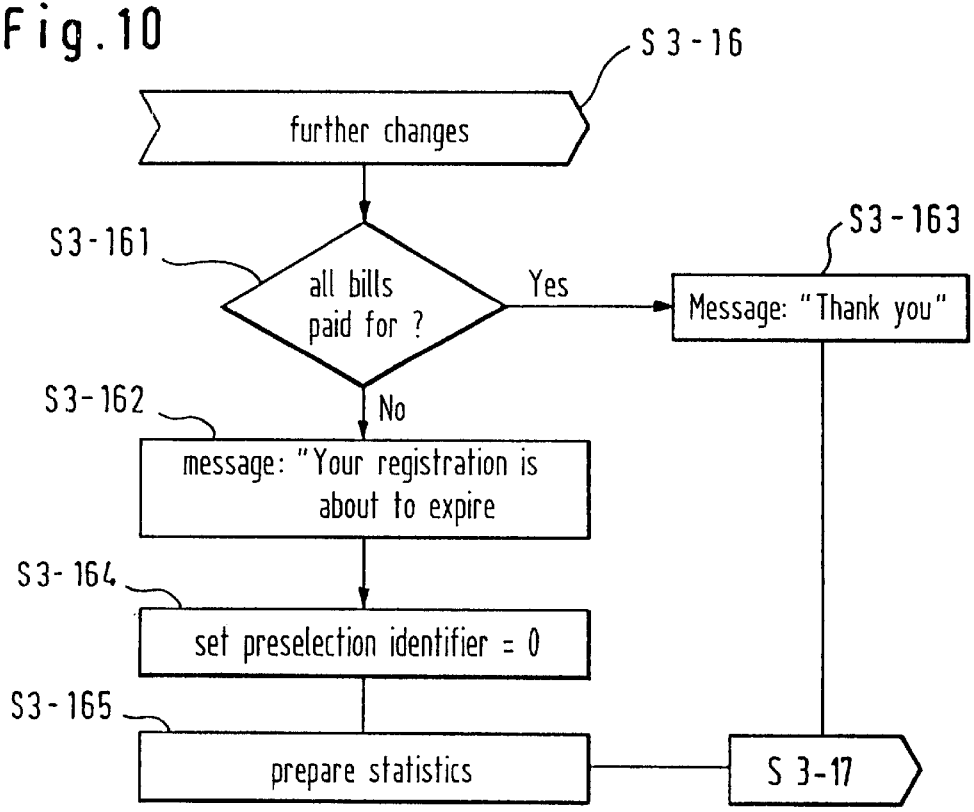
FIG. 10 shows a flow chart of an update of an existing special service parameter block and indicating that a subscriber's registration can change from "by contractual preselection" to "by subscriber selection" when a contract expires, whereby the parameter block assigned to the subscriber is updated.

The subscriber's registration can for example be altered in step S3-16 (FIG. 8), as shown in FIG. 10. Step S3-161 checks whether the subscriber has paid his bills. If this is the case, a corresponding message is sent to the subscriber in step S3-163. If step S3-161 determines that the bills have not been paid, a different message can be sent in step S3-162 according to which the preselection indicator is set to 0, indicating that the contract has expired. In step S3-165, statistics can then be compiled and stored. If the subscriber now attempts to call again, a specific updated profile will in fact be present for him, but the subscriber will no longer be identified as "by preselection" and is handled in a correspondingly different manner, i.e. the parameter block marker in the table SP indicates either a different standard parameter block for handling subscribers anew or indicates its last updated parameter block in which the preselection indicator was changed to 0.

Extending the CLI Table

Although, as described in FIG. 6, various types of presetting can be performed for the profiles of individual CLIs, it cannot of course be guaranteed that all the CLIs that are potentially able to direct a call from the local network to the transmission network are also actually known to the device IN. As described, the entry n may therefore be provided in the assignment table SP with regard to the calling numbers of networks LN1, LN2. Not only CLI and CSP are transferred via the ISUP protocol as standard, but also the call number NDC of the station to be called. The call number as another embodiment of the device IN can therefore also be preset into the assignment table SP with a standard parameter block, although the called subscriber of the other second network LN2 may never have attempted to use the transmission network. If the called subscriber then himself wishes to place a call via the transmission network, at least one piece of basic information or a basic profile is already stored for him in the device IN, thus allowing this new subscriber in turn to be provided with other special services as well.

As described above, a predetermined profile or format (i.e. a special service parameter block) that is used to define special functions, programs (i.e. the special services) is assigned according to the invention to each calling and/or potentially calling subscriber. This profile can also be changed over time, depending on the transmission network's characteristics of use by the individual subscribers. Such an application of special services is not comparable with the black-and-white test described at the outset. Based on a minimum amount of information on the subscribers, which the local networks transfer via the protocol as part of standard procedure, viz. at least CLI, the subscriber can be regarded not just as a "call to be switched" as a result of evaluating the CLI (possibly the NDC as well), but he can be processed specifically using his personal subscriber profile, without having to fall back on further information from the local network. The subscribers are therefore individually handled and a call is not just switched.

The invention is not restricted to the above described embodiments, which only serve the general explanation of the principle of the invention. Within the scope of the appended claims the invention can also be carried out in different embodiments. Thus, a skilled person can perform variations and modifications of the invention on the basis of the teachings disclosed herein. In particular, the invention can comprise embodiments which result from a combination of respective single features from the claims. Reference numerals in the claims only serve clarification purposes and do not limit the scope of protection.

What is claimed is:

1. A communication system for switching calls between a first subscriber station (A, B) of a first local network (LN1) and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying the subscriber station (B, A) from which said call set-up request originates, the transmission network comprising a special service provider (IN) connected to said at least one switching center (SSP1, SSP2, EX), for receiving at least said call line identification parameter (CLI) of said call set-up parameter block (CSP, CLI) from said switching center when there is a subscriber station call set-up request; and for performing special services for the calling subscriber station in accordance with said received call line identification parameter (CLI), wherein in addition to the call line identification parameter (CLI), the call set-up parameter block (CSP, CLI) comprises a transmission network selection parameter (CSP), wherein the switching center (SSP1, SSP2, EX) determines on account of said transmission network selection parameter (CSP) whether the transmission network is selected for switching the call, and wherein the local network selects a transmission network provided for transferring the call initiated by the subscriber station from a plurality of transmission networks in accordance with a concluded contract between the subscriber station and the transmission network operator and correspondingly sets said transmission network selection parameter (CSP) (transmission network selection by contractual preselection).

2. A communication system for switching calls between a first subscriber station (A, B) of a first local network (LN1)

and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying the subscriber station (B, A) from which said call set-up request originates, the transmission network comprising a special service provider (IN) connected to said at least one switching center (SSP1, SSP2, EX), for receiving at least said call line identification parameter (CLI) of said call set-up parameter block (CSP, CLI) from said switching center when there is a subscriber station call set-up request; and for performing special services for the calling subscriber station in accordance with said received call line identification parameter (CLI), wherein in addition to the call line identification parameter (CLI), the call set-up parameter block (CSP, CLI) comprises a transmission network selection parameter (CSP), wherein the switching center (SSP1, SSP2, EX) determines on account of said transmission network selection parameter (CSP) whether the transmission network is selected for switching the call, and wherein the subscriber himself selects a transmission network provided for transferring the call initiated by the subscriber station from a plurality of transmission networks and correspondingly sets said transmission network selection parameter (CSP) (transmission network selection by subscriber selection).

3. A communication system according to claim 2, wherein the local network selects a transmission network provided for transferring the call initiated by the subscriber station from a plurality of transmission networks in accordance with a concluded contract between the subscriber station and the transmission network operator and correspondingly sets said transmission network selection parameter (CSP) (transmission network selection by contractual preselection); and wherein said switching center (SSP1, SSP2, EX) comprises means in which call line identification parameters (CLI) are first stored, the parameters identifying specific subscribers and/or subscriber stations whose calls are permitted for transfer via the transmission network by contract between the transmission network operator and the subscriber and/or subscriber station; and the switching center (SSP1, SSP2) compares said received call line identification parameter (CLI) with said stored call line identification parameter (CLI) when there is a call set-up request, and allows the call to be set up or switched when a match is established (calls with transmission network selection by contractual preselection) and blocks it when no match is established (call with transmission network selection by subscriber selection).

4. A communication system for switching calls between a first subscriber station (A, B) of a first local network (LN1) and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying the subscriber station (B, A) from which said call set-up request originates, the transmission network comprising a special service provider (IN) connected to said at least one switching center (SSP1, SSP2, EX), for receiving at least said call line identification parameter (CLI) of said call set-up parameter block (CSP, CLI) from said switching center when there is a subscriber station call set-up request; and for performing special services for the calling subscriber station in accordance with said received call line identification parameter (CLI), wherein said switching center (SSP1, SSP2, EX) transmits the call set-up parameter block (CLI, CSP) to a special service control means (SCP) of said special service provider (IN) including memory means in which call line identification parameters (CLI) are first stored, the parameters identifying specific subscribers and/or subscriber stations whose calls are permitted for transfer via the transmission network by contract between the transmission network operator and the subscriber and/or subscriber station (calls with transmission network selection by contractual preselection); and said special service control means (SCP) compares the received call line identification parameter (CLI) with the stored call line identification parameters (CLI) when there is a call set-up request and performs special services during call set-up when no match is established (call with transmission network selection by subscriber selection).

5. A communication system according to claim 4, wherein said special service control means (SCP) also performs special services during call set-up when a match is established (call with transmission network selection by contractual preselection).

6. A communication system according to claim 4, wherein when said special service control means (SCP) does not establish a match, it selects one of several standard special service parameter blocks, performs the special services indicated therein and then stores this or another standard special service parameter block as a special service parameter block together with said associated call line identification parameter (CLI) in said memory means.

7. A communication system according to claim 6, wherein said special service control means (SCP) updates the parameters in said special service parameter block upon reception of said associated call line identification parameter (CLI) and/or assigns a new special service parameter block to the call line identification parameter.

8. A communication system for switching calls between a first subscriber station (A, B) of a first local network (LN1) and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying the subscriber station (B, A) from which said call set-up request originates, the transmission network comprising a special service provider (IN) connected to said at least one switching center (SSP1, SSP2, EX), for receiving at least said call line identification parameter (CLI) of said call set-up parameter block (CSP, CLI) from said switching center when there is a subscriber station call set-up request; and for performing special services for the calling subscriber station in accordance with said received call line identification parameter (CLI), wherein said special service provider (IN) comprises memory means in which a special service parameter block (1, 2, x, z) is stored for each call line identification parameter (CLI), said parameter block indicating the special services to be performed for a subscriber and/or subscriber station exhibiting the respective call line identification parameters.

9. A communication system according to claim 8, wherein for subscribers and/or subscriber stations who conclude a contract directly with the transmission network operator, a special service control means (SCP) selects one of several standard special service parameter blocks when the contract is concluded, and stores this block in said memory means as the associated special service parameter block for the respective call line identification parameter (CLI), wherein said special service control means performs the special services indicated by this special service parameter block upon reception of the associated call line identification parameter (CLI).

10. A communication system according to claim 9, wherein said special service control means (SCP) updates the parameters in said special service parameter block upon reception of said associated call line identification parameter (CLI) and/or assigns a new special service parameter block to the call line identification parameter.

11. A communication system according to claim 10, wherein said special service control means (SCP) updates the existing or re-assigns a new special service parameter block with the assistance of a data communication means (IP) which performs interactive communication (DTMF) with the calling subscriber or subscriber station.

12. A method of switching calls between a first subscriber station (A, B) of a first local network (LN1) and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying said subscriber station (B, A) from which said call set-up request originates, comprising the following steps:

connecting a special service provider (IN) to the at least one switching center (SSP1, SSP2, EX) of the transmission network;

receiving at least the call line identification parameter (CLI) of the call set-up parameter block (CSP, CLI) from the switching center when there is a subscriber station call set-up request; and performing special services for the calling subscriber station in accordance with the received call line identification parameter (CLI), wherein in addition to the call line identification parameter (CLI), the call set-up parameter block (CSP, CLI) comprises a transmission network selection parameter (CSP), wherein the switching center (SSP1, SSP2, EX) performs a determination on the basis of the transmission network selection parameter (CSP) whether the transmission network is selected for switching the call, wherein the subscriber himself selects a transmission network provided for transferring the call initiated by the subscriber station from a plurality of transmission networks and correspondingly selects said transmission network selection parameter (CSP) (transmission network selection by subscriber selection), wherein the local network selects a transmission network provided for transferring the call initiated by the subscriber station from a plurality of transmission networks in accordance with a concluded contract between the subscriber station and the transmission network operator and correspondingly sets said transmission network selection parameter (CSP) (transmission network selection by contractual preselection); and wherein the switching center (SSP1, SSP2, EX) comprises means in which call line identification parameters (CLI) are first stored, the parameters identifying specific subscribers and/or subscriber stations whose calls are permitted for transfer via the transmission network by contract between the transmission network operator and the subscriber and/or subscriber station; and when there is a call set-up request, the switching center (SSP1, SSP2) compares the received call line identification parameter (CLI) with the stored call line identification parameter and allows the call to be set up and switched when a match is established (calls with transmission network selection by contractual preselection), and blocks it when no match is established (call with transmission network selection by subscriber selection).

13. A method of switching calls between a first subscriber station (A, B) of a first local network (LN1) and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying said subscriber station (B, A) from which said call set-up request originates, comprising the following steps:

connecting a special service provider (IN) to the at least one switching center (SSP1, SSP2, EX) of the transmission network;

receiving at least the call line identification parameter (CLI) of the call set-up parameter block (CSP, CLI) from the switching center when there is a subscriber station call set-up request; and performing special services for the calling subscriber station in accordance with the received call line identification parameter (CLI), wherein the switching center (SSP1, SSP2, EX) transmits the call set-up parameter block (CLI, CSP) to a special service control means (SCP) of said special service provider (IN) including a memory means in which call line identification parameters (CLI) are first stored, the parameters identifying specific subscribers and/or subscriber stations whose calls are permitted for transfer via said transmission network by contract between the transmission network operator and the subscriber and/or subscriber station (calls with transmission network selection by contractual preselection); and when there is a call set-up request, said special service control means (SCP) compares the received call line identification parameter (CLI) with the stored call line identification parameters (CLI) and performs special services during call set-up when no match is established (call with transmission network selection by subscriber selection).

14. A method according to claim 13,
wherein said special service control means (SCP) also performs special services during call set-up when a match is established (call with transmission network selection by contractual preselection).

15. A method according to claim 13,
wherein when said special service control means (SCP) does not establish a match, it selects one of several standard special service parameter blocks, performs the special services indicated therein and then stores this or another standard special service parameter block together with the associated call line identification parameter (CLI) in said memory means.

16. A method of switching calls between a first subscriber station (A, B) of a first local network (LN1) and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying said subscriber station (B, A) from which said call set-up request originates, comprising the following steps:

connecting a special service provider (IN) to the at least one switching center (SSP1, SSP2, EX) of the transmission network;

receiving at least the call line identification parameter (CLI) of the call set-up parameter block (CSP, CLI) from the switching center when there is a subscriber station call set-up request; and performing special services for the calling subscriber station in accordance with the received call line identification parameter (CLI), wherein said special service provider (IN) comprises memory means in which a special service parameter block (1, 2, x, z) is stored for each call line identification parameter (CLI), the parameter block indicating the special services to be performed for a subscriber and/or subscriber station exhibiting the respective call line identification parameters.

17. A method according to claim 16,
wherein for subscribers and/or subscriber stations that conclude a contract directly with the transmission network operator, a special service control means (SCP) selects one of several standard special service parameter blocks when the contract is concluded, and stores this block in said memory means as said associated special service parameter block for said respective call line identification parameters (CLI), wherein said special service control means performs the special services indicated by this special service parameter block upon reception of the associated call line identification parameter (CLI).

18. A method of switching calls between a first subscriber station (A, B) of a first local network (LN1) and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying said subscriber station (B, A) from which said call set-up request originates, comprising the following steps:

connecting a special service provider (IN) to the at least one switching center (SSP1, SSP2, EX) of the transmission network;

receiving at least the call line identification parameter (CLI) of the call set-up parameter block (CSP, CLI) from the switching center when there is a subscriber station call set-up request; and performing special services for the calling subscriber station in accordance with the received call line identification parameter (CLI), wherein in addition to the call line identification parameter (CLI), the call set-up parameter block (CSP, CLI) comprises a transmission network selection parameter (CSP), wherein the switching center (SSP1, SSP2, EX) performs a determination on the basis of the transmission network selection parameter (CSP) whether the transmission network is selected for switching the call, wherein a special service control means (SCP) updates the parameters in said special service parameter block on reception of the associated call line identification parameter (CLI) and/or assigns a new special service parameter block to the call line identification parameter.

19. A method according to claim 18,
wherein said special service control means (SCP) updates the existing or re-assigns a new special service parameter block with the assistance of data communication means (IP) which performs interactive communication (DTMF) with the calling subscriber or subscriber station.

20. A communication system for switching calls between a first subscriber station (A, B) of a first local network (LN1) and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying the subscriber station (B, A) from which said call set-up request originates, the transmission network comprising a special service provider (IN) connected to said at least one switching center (SSP1, SSP2, EX), for receiving at least said call line identification parameter (CLI) of said call set-up parameter block (CSP, CLI) from said switching center when there is a subscriber station call set-up request; and for performing special services for the calling subscriber station in accordance with said received call line identification parameter (CLI); and wherein in addition to the call line identification parameter (CLI), the call set-up parameter block (CSP, CLI) comprises a transmission network selection parameter (CSP), wherein the switching center (SSP1, SSP2, EX) determines on account of said transmission network selection parameter (CSP) whether the transmission network is selected for switching the call.

21. A communication system for switching calls between a first subscriber station (A, B) of a first local network (LN1) and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying the subscriber station (B, A) from which said call set-up request originates, the transmission network comprising a special service provider (IN) connected to said at least one switching center (SSP1, SSP2, EX), for receiving at least said call line identification parameter (CLI) of said call set-up parameter block (CSP, CLI) from said switching center when there is a subscriber station call set-up request; and for performing special services for the calling subscriber station in accordance with said received call line identification parameter (CLI); and wherein the local network selects a transmission network provided for transferring the call initiated by the subscriber station from a plurality of transmission networks in accordance with a concluded contract between the subscriber station and the transmission network operator and correspondingly sets said transmission network selection parameter (CSP) (transmission network selection by contractual preselection).

22. A communication system for switching calls between a first subscriber station (A, B) of a first local network (LN1) and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying the subscriber station (B, A) from which said call set-up request originates, the transmission network comprising a special service provider (IN) connected to said at least one switching center (SSP1, SSP2, EX), for receiving at least said call line identification parameter (CLI) of said call set-up parameter block (CSP, CLI) from said switching center when there is a subscriber station call set-up request; and for performing special services for the calling subscriber station in accordance with said received call line identification parameter (CLI); and wherein the subscriber himself selects a transmission network provided for transferring the call initiated by the subscriber station from a plurality of transmission networks and correspondingly sets said transmission network selection parameter (CSP) (transmission network selection by subscriber selection).

23. A method of switching calls between a first subscriber station (A, B) of a first local network (LN1) and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying said subscriber station (B, A) from which said call set-up request originates, comprising the following steps:

connecting a special service provider (IN) to the at least one switching center (SSP1, SSP2, EX) of the transmission network;

receiving at least the call line identification parameter (CLI) of the call set-up parameter block (CSP, CLI) from the switching center when there is a subscriber station call set-up request; and performing special services for the calling subscriber station in accordance with the received call line identification parameter (CLI); and wherein in addition to the call line identification parameter (CLI), the call set-up parameter block (CSP, CLI) includes a transmission network selection parameter (CSP), wherein the switching center (SSP1, SSP2, EX) performs a determination on the basis of the transmission network selection parameter (CSP) whether the transmission network is selected for switching the call.

24. A method of switching calls between a first subscriber station (A, B) of a first local network (LN1) and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying said subscriber station (B, A) from which said call set-up request originates, comprising the following steps:

connecting a special service provider (IN) to the at least one switching center (SSP1, SSP2, EX) of the transmission network;

receiving at least the call line identification parameter (CLI) of the call set-up parameter block (CSP, CLI) from the switching center when there is a subscriber station call set-up request; and performing special services for the calling subscriber station in accordance with the received call line identification parameter (CLI); and wherein in addition to the call line identification parameter (CLI), the call set-up parameter block (CSP, CLI)

includes a transmission network selection parameter (CSP), wherein the switching center (SSP1, SSP2, EX) performs a determination on the basis of the transmission network selection parameter (CSP) whether the transmission network is selected for switching the call; and wherein the local network selects a transmission network provided for transferring the call initiated by the subscriber station from a plurality of transmission networks in accordance with a concluded contract between the subscriber station and the transmission network operator and correspondingly sets said transmission network selection parameter (CSP) (transmission network selection by contractual preselection).

25. A method according to claim 24, wherein a special service control means (SCP) updates the parameters in said special service parameter block on reception of the associated call line identification parameter (CLI) and/or assigns a new special service parameter block to the call line identification parameter.

26. A method of switching calls between a first subscriber station (A, B) of a first local network (LN1) and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying said subscriber station (B, A) from which said call set-up request originates, comprising the following steps:

connecting a special service provider (IN) to the at least one switching center (SSP1, SSP2, EX) of the transmission network;

receiving at least the call line identification parameter (CLI) of the call set-up parameter block (CSP, CLI) from the switching center when there is a subscriber station call set-up request; and performing special services for the calling subscriber station in accordance with the received call line identification parameter (CLI); and wherein in addition to the call line identification parameter (CLI), the call set-up parameter block (CSP, CLI) includes a transmission network selection parameter (CSP), wherein the switching center (SSP1, SSP2, EX) performs a determination on the basis of the transmission network selection parameter (CSP) whether the transmission network is selected for switching the call; and wherein the subscriber himself selects a transmission network provided for transferring the call initiated by the subscriber station from a plurality of transmission networks and correspondingly selects said transmission network selection parameter (CSP) (transmission network selection by subscriber selection).

27. A communication system for switching calls between a first subscriber station (A, B) of a first local network (LN1) and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying the subscriber station (B, A) from which said call set-up request originates, the transmission network comprising a special service provider (IN) connected to said at least one switching center (SSP1, SSP2, EX), for receiving at least said call line identification parameter (CLI) of said call set-up parameter block (CSP, CLI) from said switching center when there is a subscriber station call set-up request; and for performing special services for the calling subscriber station in accordance with said received call line identification parameter (CLI); and wherein said special service provider (IN) comprises memory means in which a special service parameter block (1, 2, x, z) is stored for each call line identification parameter (CLI), said parameter block indicating the special services to be performed for a subscriber and/or subscriber station exhibiting the respective call line identification parameters; and wherein a special service control means (SCP) updates the parameters in said special service parameter block upon reception of said associated call line identification parameter (CLI) and/or assigns a new special service parameter block to the call line identification parameter.

28. A method of switching calls between a first subscriber station (A, B) of a first local network (LN1) and a second subscriber station (B, A) of a second local network (LN2) via at least one transmission network (FN1, FN2) provided between the local networks (LN1, LN2) and having at least one switching center (SSP1, SSP2, EX) connected to the first and second local networks, wherein the at least one switching center receives a call set-up parameter block (CSP, CLI) having at least one call line identification parameter (CLI) each time there is a subscriber station call set-up request from the respective local network, the parameter identifying said subscriber station (B, A) from which said call set-up request originates, comprising the following steps:

connecting a special service provider (IN) to the at least one switching center (SSP1, SSP2, EX) of the transmission network;

receiving at least the call line identification parameter (CLI) of the call set-up parameter block (CSP, CLI) from the switching center when there is a subscriber station call set-up request; and performing special services for the calling subscriber station in accordance with the received call line identification parameter (CLI); and wherein said special service provider (IN) comprises memory means in which a special service parameter block (1, 2, x, z) is stored for each call line identification parameter (CLI), the parameter block indicating the special services to be performed for a subscriber and/or subscriber station exhibiting the respective call line identification parameters; and wherein a special service control means (SCP) updates the parameters in said special service parameter block on reception of the associated call line identification parameter (CLI) and/or assigns a new special service parameter block to the call line identification parameter.

* * * * *